(12) United States Patent
Enomoto et al.

(10) Patent No.: US 11,495,855 B2
(45) Date of Patent: Nov. 8, 2022

(54) SECONDARY BATTERY INSULATING PLATE AND SECONDARY BATTERY INCLUDING THE SAME

(71) Applicants: Panasonic Corporation, Kadoma (JP); SANYO Electric Co., Ltd., Daito (JP)

(72) Inventors: Takeshi Enomoto, Osaka (JP); Tomohiko Yokoyama, Osaka (JP); Yuji Yamagami, Osaka (JP); Kazutoshi Kohira, Hyogo (JP)

(73) Assignees: PANASONIC HOLDINGS CORPORATION, Kadoma (JP); SANYO Electric Co., Ltd., Daito (JP)

( * ) Notice: Subject to any disclaimer, the term of this patent is extended or adjusted under 35 U.S.C. 154(b) by 102 days.

(21) Appl. No.: 16/582,509

(22) Filed: Sep. 25, 2019

(65) Prior Publication Data
US 2020/0020897 A1   Jan. 16, 2020

Related U.S. Application Data

(63) Continuation of application No. PCT/JP2018/001854, filed on Jan. 23, 2018.

(30) Foreign Application Priority Data

Mar. 27, 2017   (JP) .............................. JP2017-060788

(51) Int. Cl.
*H01M 50/40* (2021.01)
*H01M 50/155* (2021.01)
(Continued)

(52) U.S. Cl.
CPC ..... *H01M 50/155* (2021.01); *H01M 10/0525* (2013.01); *H01M 10/0587* (2013.01); *H01M 50/325* (2021.01); *H01M 50/40* (2021.01)

(58) Field of Classification Search
CPC .................................................. H01M 50/155
See application file for complete search history.

(56) References Cited

U.S. PATENT DOCUMENTS

2015/0010793 A1*  1/2015  Yokoyama .......... H01M 50/183
                                                                429/53
2017/0317326 A1   11/2017  Fujikawa et al.
(Continued)

FOREIGN PATENT DOCUMENTS

JP   2008-027635 A   2/2008
WO   2013/099295 A1   7/2013
(Continued)

OTHER PUBLICATIONS

International Search Report dated Mar. 6, 2018, issued in counterpart Application No. PCT/JP2018/001854 (1 page).

*Primary Examiner* — Ula C Ruddock
*Assistant Examiner* — Thomas H. Parsons
(74) *Attorney, Agent, or Firm* — WHDA, LLP

(57) ABSTRACT

An insulating plate for a secondary battery includes a wound electrode group, an electrolyte, a cylindrical battery case that houses the electrode group and the electrolyte, and a sealing body that seals an opening of the battery case and includes a discharge valve. The insulating plate is disposed between the electrode group and the sealing body and has a disk shape with a thickness T of 0.1 mm or more. The insulating plate has a first hole formed centrally therein and at least one second hole formed around the first hole so as to extend along the outer periphery of the disk shape. The ratio (=T/D) of the thickness T to a diameter D of the insulating plate is 0.016 or less, and the insulating plate has an opening ratio of 36% or less.

13 Claims, 5 Drawing Sheets

(51) Int. Cl.
*H01M 10/0525* (2010.01)
*H01M 10/0587* (2010.01)
*H01M 50/325* (2021.01)

(56) References Cited

U.S. PATENT DOCUMENTS

2018/0047973 A1 2/2018 Kunoike et al.
2018/0301677 A1 10/2018 Yokoyama et al.

FOREIGN PATENT DOCUMENTS

| WO | 2016/067510 A1 | 5/2016 |
| WO | 2016/157749 A1 | 10/2016 |

* cited by examiner

SECONDARY BATTERY INSULATING PLATE AND SECONDARY BATTERY INCLUDING THE SAME

TECHNICAL FIELD

The present invention relates to an improvement in an insulating plate disposed between an electrode group and a sealing body in a secondary battery.

BACKGROUND ART

In secondary batteries, insulating plates are disposed between electrode groups and sealing bodies in order to maintain insulation between the electrode groups and leads extending from the electrode groups, battery cases, sealing bodies that seal openings of the battery cases, and the like. In some secondary batteries, sealing bodies are provided with discharge valves for discharging gas generated in the batteries. In such a secondary battery, an insulating plate is provided with a hole for passing therethrough a lead extending from an electrode group and a hole for facilitating the flow of gas.

In PTL 1, in a secondary battery including a sealing body provided with a valve member for discharge, an insulating plate having a hole near its center is disposed between an electrode group and the sealing body. PTL 2 proposes the use of an insulating plate 820 having, in plan view, one semicircular hole 821 and three spot holes 822b, as illustrated in FIG. 8.

CITATION LIST

Patent Literature

PTL 1: International Publication No. 2016/157749
PTL 2: International Publication No. 2013/099295

SUMMARY OF INVENTION

To ensure a high capacity, the thickness of the insulating plate is preferably small. However, the insulating plate is provided with a hole in some cases, and if the thickness is small, it is difficult to ensure sufficient strength. When the battery has a large outer diameter and the insulating plate is large so as to be sized to the outer diameter, the strength of the insulating plate is low if the thickness thereof is the same. When the strength of the insulating plate is insufficient, the insulating plate may be broken by gas generated in the battery. If the insulating plate is deformed or broken in the battery, the electrode group may be pushed out to the sealing body to clog a valve member of the sealing body, leading to insufficient discharge.

An insulating plate according to one aspect of the present disclosure relates to an insulating plate for a secondary battery including a wound electrode group, an electrolyte, a cylindrical battery case that houses the electrode group and the electrolyte, and a sealing body that seals an opening of the battery case and includes a discharge valve, wherein the insulating plate is disposed between the electrode group and the sealing body and has a disk shape with a thickness T of 0.1 mm or more, the insulating plate has a first hole formed centrally therein and at least one second hole formed around the first hole so as to extend along the outer periphery of the disk shape, the ratio (=T/D) of the thickness T to a diameter D of the insulating plate is 0.016 or less, and the insulating plate has an opening ratio of 36% or less.

Another aspect of the present disclosure relates to a secondary battery including: a wound electrode group, an electrolyte;

a cylindrical battery case that houses the electrode group and the electrolyte, a sealing body that seals an opening of the battery case and includes a discharge valve; and an insulating plate disposed between the electrode group and the sealing body, wherein the insulating plate has a disk shape with a thickness T of 0.1 mm or more, the insulating plate has a first hole formed centrally therein and at least one second hole formed around the first hole so as to extend along the outer periphery of the disk shape, the ratio (=T/D) of the thickness T to a diameter D of the insulating plate is 0.016 or less, and the insulating plate has an opening ratio of 36% or less.

According to the above aspects of the present disclosure, discharge can be smoothly carried out while ensuring a high capacity of the secondary battery.

DESCRIPTION OF EMBODIMENTS

Figure 1:
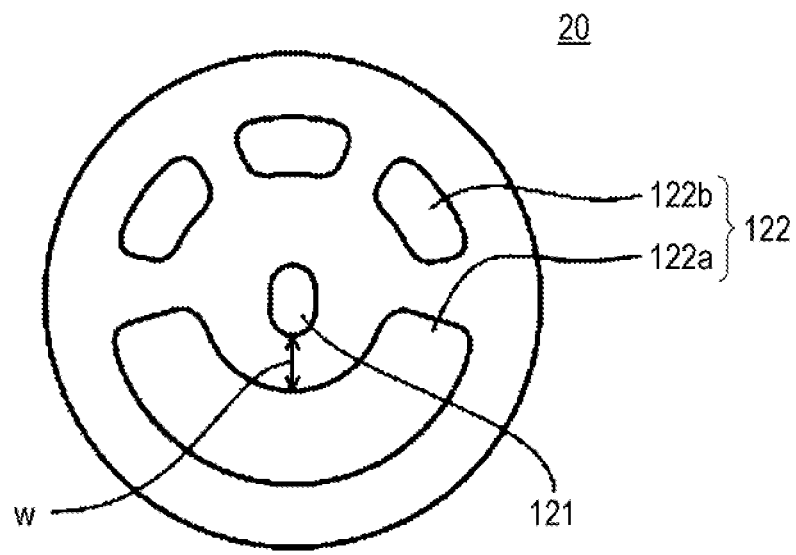
FIG. 1 is a top view schematically illustrating an insulating plate according to one embodiment of the present invention.

An insulating plate according to one embodiment of the present invention is an insulating plate for a secondary battery including a wound electrode group, an electrolyte, a cylindrical battery case that houses the electrode group and the electrolyte, and a sealing body that seals an opening of the battery case and includes a discharge valve. The insulating plate is disposed between the electrode group and the sealing body and has a disk shape with a thickness T of 0.1 mm or more. The insulating plate has a first hole formed centrally therein and at least one second hole formed around the first hole so as to extend along the outer periphery of the disk shape. The ratio (=T/D) of the thickness T to a diameter D of the insulating plate is 0.016 or less, and the insulating plate has an opening ratio of 36% or less.

A secondary battery according to one embodiment of the present invention includes a wound electrode group, an electrolyte, a cylindrical battery case that houses the electrode group and the electrolyte, a sealing body that seals an opening of the battery case and includes a discharge valve, and the above-described insulating plate disposed between the electrode group and the sealing body.

Some secondary batteries of the related art discharge gas from the bottom of battery cases, which is opposite to sealing bodies. In the case of such a battery, a large amount of gas can be discharged from the bottom of a battery case, and thus an insulating plate (a first insulating plate) disposed between an electrode group and a sealing body can be very flexibly designed. By contrast, in the case of a secondary battery including a sealing body having a discharge valve, gas generated in the battery flows toward the discharge valve, and thus a first insulating plate disposed across the pathway of gas is required to have some degree of strength. The first insulating plate does not contribute to the capacity of the battery, and thus to ensure a high capacity, the thickness of the first insulating plate is preferably small. However, when a big hole is formed at the center of the first insulating plate in order to pass a lead extending from an electrode group and to facilitate the flow of gas, it is difficult to ensure sufficient strength. In particular, when the thickness of the first insulating plate is small, the strength is significantly reduced. If the first insulating plate is deformed or broken in the battery, the electrode group may be pushed out to the sealing body to clog a valve member of the sealing body, leading to insufficient discharge.

According to the above embodiment of the present invention, when the sealing body including a discharge valve is used, as the first insulating plate disposed between the sealing body and the electrode group, an insulating plate having a first hole formed centrally therein and at least one second hole formed around the first hole so as to extend along the outer periphery of the disk shape of the first insulating plate is used. In the case of a secondary battery including a wound electrode group, when gas is generated from the electrode group, the amount of emission in the vicinity of the winding axis and in the vicinity of the outer periphery of the electrode group tends to be large. Therefore, by providing a first insulating plate having a first hole and at least one second hole at locations as described above, high discharge properties can be ensured if the first insulating plate has an opening ratio of as low as 36% or less.

The first insulating plate has an opening ratio of 36% or less and a thickness T of 0.1 mm or more, and the ratio (=T/D) of the thickness T to a diameter D of the first insulating plate is 0.016 or less. Therefore, the strength of the first insulating plate can be ensured although the T/D ratio is low. Thus, a high capacity of the secondary battery can be ensured, and at the same time, discharge can be smoothly carried out. Since high strength of the first insulating plate is ensured, deformation and breakage of the first insulating plate are reduced, thus reducing inhibition of discharge through the discharge valve of the sealing body.

As described above, the first insulating plate according to this embodiment is used for a secondary battery including a sealing body including a discharge valve, and in particular is suitable for use for a secondary battery having no discharge valves at the bottom of a battery case. Discharge valves at the bottom of a battery case also encompass a thin-walled portion formed for the purpose of discharge.

The thickness T of the first insulating plate is a thickness of a region other than the holes of the first insulating plate. As the thickness T, an average value of thicknesses measured at multiple points (e.g., five points) on the first insulating plate may be used.

The first insulating plate has a circular shape or a shape similar to a circle in the planar direction (the direction perpendicular to the thickness direction). The diameter D of the first insulating plate is a diameter (outer diameter) of the first insulating plate in the planar direction, and when the external shape of the first insulating plate is not circular, the diameter D is a diameter of a circle (equivalent circle) having the same area as the external shape (the region surrounded by outer edges in the planar direction of the first insulating plate).

The opening ratio of the first insulating plate is the ratio (%) of the area of the hole to the area of the region surrounded by outer edges of the first insulating plate in a plan view (or top view) of the first insulating plate. The area of the hole is the sum of the area of the first hole and the area of the second hole in a plan view of the first insulating plate, and when the first insulating plate has a hole (third hole) other than the first hole and the second hole, the area of the hole is the total area of the first hole, the second hole, and the third hole.

The insulating plate (first insulating plate) and the secondary battery according to this embodiment will now be described more specifically by referring to the drawings as appropriate.

[Insulating Plate (First Insulating Plate)]

In the secondary battery including a sealing body including a discharge valve, the first insulating plate is disposed between the sealing body and the electrode group and may also be referred to as an upper insulating plate. The first insulating plate has a disk shape because it is disposed on the electrode group having a cylindrical shape or a shape similar to a cylinder. The first insulating plate has a first hole formed centrally therein and at least one second hole formed around the first hole so as to extend along the outer periphery of the disk shape. When gas is generated in the electrode group, the gas passes through the first hole and the second hole and is discharged from the discharge valve of the sealing body. The lead extending from the electrode group may be connected to the sealing body or the battery case through the first hole and/or the second hole.

Since the first hole is formed centrally in the first insulating plate having a disk shape and the second hole is formed so as to extend along the outer periphery of the first insulating plate, gas, if emitted in a large amount from the winding axis and the outer periphery of the electrode group, can pass through the first hole and the second hole and be smoothly discharged from the discharge valve of the sealing body. To further improve gas discharge properties, the first hole is preferably disposed above the winding axis of the electrode group. For the same reason, the second hole is preferably disposed on the outer periphery side of the electrode group.

The first insulating plate may have two or more first holes but need only have one first hole.

To facilitate the discharge of gas through the first hole while ensuring the strength of the first insulating plate, the opening ratio of the first hole is preferably 1% or more and 3% or less, particularly preferably 1% or more and 2% or less.

The opening ratio of the first hole is the ratio (%) of the area of the first hole to the area of the region surrounded by outer edges of the first insulating plate in a plan view (or a top view) of the first insulating plate. The area of the first hole is the area of the first hole in a plan view of the first insulating plate. When the first insulating plate has a plurality of first holes, the opening ratio of the first hole is the sum of opening ratios of the plurality of first holes.

The first hole may have any shape, for example, a circular shape, an oval shape, a polygonal shape such as a quadrangular shape, or a shape similar to these shapes in a plan view of the first insulating plate. The shape of the first hole is preferably a vertically elongated shape such as an oval shape, a rectangular shape, or a shape similar to these shapes. A first hole having a vertically elongated shape provides an advantage in that gas discharge properties are ensured, while the strength of the first insulating plate in a direction along the minor axis of the first hole tends to be strong. The first hole having a vertically elongated shape preferably has an aspect ratio of, for example, 1.2 or more and 4 or less, more preferably 1.3 or more and 2 or less. When the aspect ratio is in this range, gas discharge properties and strength tend to be well-balanced.

The first insulating plate need only have at least one second hole, but for smooth passage of gas emitted from the outer periphery side of the electrode group, it is preferable to form a plurality of second holes so as to extend along the outer periphery of the first insulating plate (preferably, on the outer periphery side of the electrode group).

The shape of the second hole is not particularly limited and can be appropriately selected from the shapes as described for the first hole. When the first insulating plate has a plurality of second holes, the planar shape of the second holes is preferably a circular shape, an oval shape, a square shape, an arc shape, or a shape similar to these shapes because the second holes are easily formed so as to surround the first hole. For the second holes to be easily formed so as to surround the first hole, particularly, the second holes preferably include at least one arc-shaped hole and at least one (preferably more than one) spot hole.

The opening ratio of one second hole is, for example, 7% or more and 35% or less, preferably 20% or more and 30% or less. The spot hole is mainly for discharging gas emitted from the outer periphery of the electrode group, and thus the opening ratio of one spot hole need not be so large, and is, for example, 1% or more and 15% or less, preferably 1% or more and 5% or less. The opening ratio of one arc-shaped hole may be selected from within the same range as that of the opening ratio of the spot hole. The arc-shaped hole is preferably used to discharge gas emitted from the outer periphery of the electrode group and also to pass the lead extending from the electrode group and connected to the sealing body or the battery case. In this case, the opening ratio of one arc-shaped hole is preferably 5% or more and 30% or less, more preferably 15% or more and 25% or less.

The number of arc-shaped holes may be one or more than one (e.g., 2 to 4). When only a lead extending from one electrode is passed through an arc-shaped hole, it is only required to form one arc-shaped hole, and if necessary, two arc-shaped holes may be formed such that leads extending from two electrodes pass through the corresponding arc-shaped holes.

The opening ratio of the first insulating plate may be adjusted by adjusting the opening ratio of each second hole, the number of second holes, the opening ratio of the first hole, and the number of first holes.

The arc-shaped hole has two corner portions on the outer periphery side of the first insulating plate having a disk shape and two corner portions on the inner periphery side of the first insulating plate. For a larger opening area of the arc-shaped hole, the angle of the corner portions on the outer periphery side is preferably formed so as to be smaller than the angle of the corner portions on the inner periphery side. In this case, since the angle of the corner portions on the outer periphery side is smaller than the angle of the corner portions on the inner periphery side, the strength of regions near the corner portions on the outer periphery side of the first insulating plate tends to be low. Therefore, the arc-shaped hole is preferably formed such that at least the two corner portions on the outer periphery side are rounded. The two corner portions on the outer periphery side each have a radius of curvature (R) of preferably 0.8 mm or more, more preferably 1 mm or more or 1.5 mm or more. When the radii of curvature of the corner portions on the outer periphery side are in this range, the strength of the regions near the corner portions on the outer periphery side of the first insulating plate is easily ensured. If necessary, the corner portions on the inner periphery side may also be formed so as to be rounded.

To facilitate the flow of gas emitted from the vicinity of the outer periphery of the electrode group, the first insulating plate preferably has a plurality of spot holes formed so as to extend along the outer periphery of the disk shape. The number of spot holes is, for example, 2 to 6, preferably 2 to 5, more preferably 3 or 4.

In the first insulating plate according to this embodiment, the first hole is formed centrally, while the second hole is formed around the first hole so as to extend along the outer periphery of the disk shape of the first insulating plate. That is to say, in the first insulating plate, at least a ring-shaped region is left around the first hole (specifically, between the first hole and the second hole). The ring-shaped region serves to support the first insulating plate so that high strength of the first insulating plate can be ensured.

The ring-shaped region formed between the first hole and the second hole has a minimum width w of preferably 1 mm or more and 5 mm or less, more preferably 2 mm or more and 3 mm or less. When the minimum width w is in this range, the strength of the first insulating plate is more easily ensured.

FIG. 1 is a top view schematically illustrating an insulating plate (a first insulating plate) according to one embodiment of the present invention. FIG. 2 to FIG. 6 are variations of the first insulating plate.

A first insulating plate 20 in FIG. 1 has a first hole 121 formed centrally in the planar direction and second holes 122 formed around the first hole 121 so as to surround the first hole 121. The first hole 121 has an oval shape (a vertically elongated shape). The second holes 122 include one arc-shaped hole 122a and three spot holes 122b. These second holes 122 are formed so as to extend along the outer periphery of the first insulating plate 20. In the illustrated example, the arc-shaped hole 122a having a larger size than the spot holes 122b is disposed in one half region of the first insulating plate 20, and the spot holes 122b are disposed in line in the other half region. At least a ring-shaped region having a minimum width w is formed around the first hole 121 (specifically, between the first hole 121 and the second hole 122).

Figure 2:
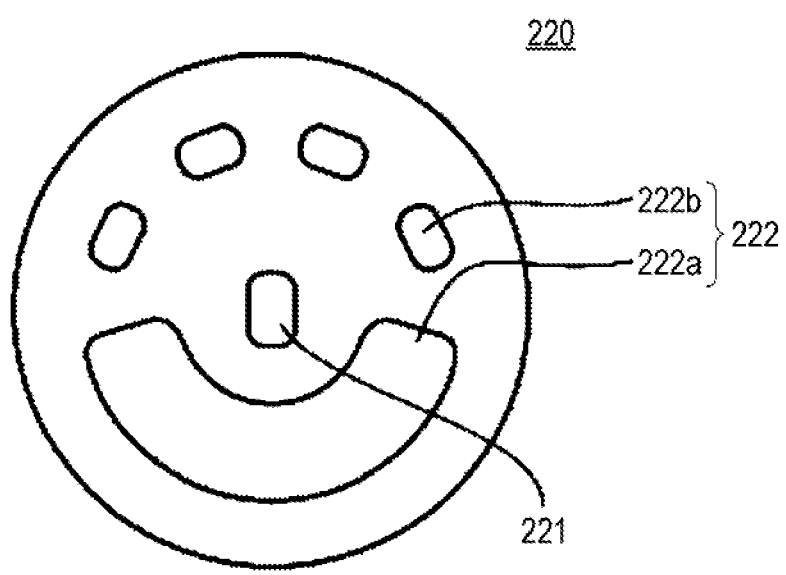
FIG. 2 is a top view schematically illustrating an insulating plate according to another embodiment of the present invention.

A first insulating plate 220 in FIG. 2 has a first hole 221 formed in the planar direction and second holes 222 formed around the first hole. The second holes 222 include an arc-shaped hole 222a and spot holes 222b. The example of FIG. 2 is the same as the insulating plate 20 in FIG. 1 except that the shape of the first hole 221 and the spot holes 222b and the number of the spot holes 222b are different. The first hole 221, when viewed from above the first insulating plate 220, has a vertically elongated shape like a rectangle whose four corners are rounded. The first insulating plate 220 has one arc-shaped hole 222a and four spot holes 222b. The four spot holes 222b each have an oval shape and are disposed in line such that the major axes of the oval shapes extend along the circumferential direction of the first insulating plate having a circular shape.

Figure 3:
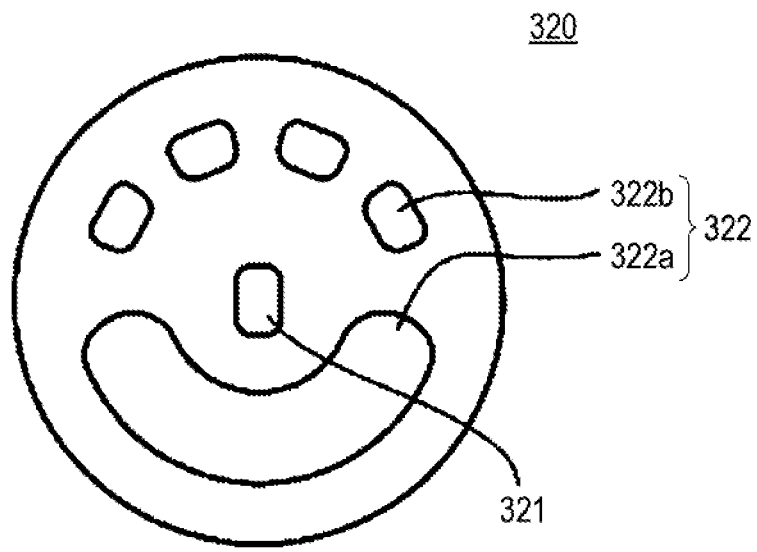
FIG. 3 is a top view schematically illustrating an insulating plate according to still another embodiment of the present invention.

A first insulating plate 320 in FIG. 3 has a first hole 321 formed centrally in the planar direction and second holes 322 formed therearound. The second holes 322 include one arc-shaped hole 322a and four spot holes 322b. The first insulating plate 320 in FIG. 3 is the same as the first insulating plate 220 in FIG. 2 except that the radii of curvature of a total of four corner portions on the outer periphery side and the inner periphery side of the arc-shaped hole 322a are large as compared with FIG. 2 and that the size and shape of the spot holes 322b are different from those in FIG. 2. In FIG. 3, the spot holes 322b each have a shape of a trapezoid whose side on the inner periphery side of the first insulating plate 320 is short, whose side on the outer periphery side is long, and whose corners are rounded.

Figure 4:
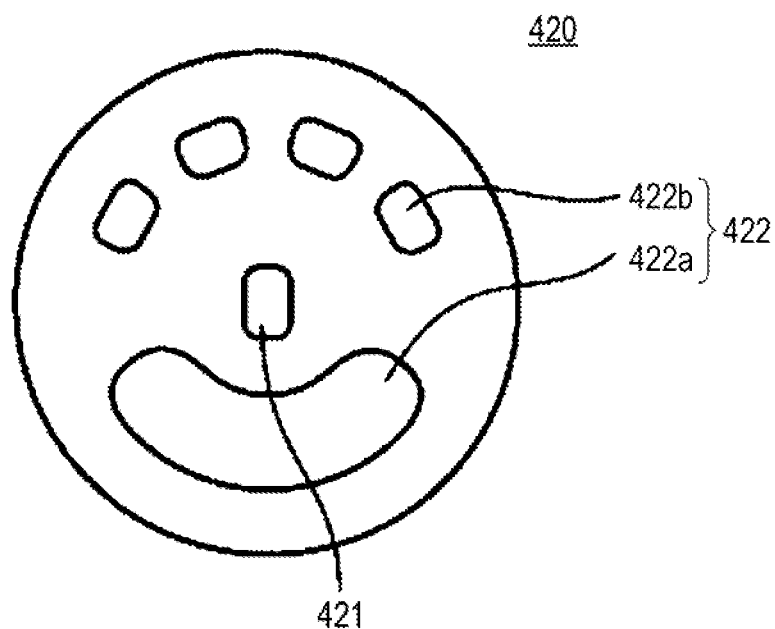
FIG. 4 is a top view schematically illustrating an insulating plate according to another embodiment of the present invention.

A first insulating plate 420 in FIG. 4 has a first hole 421 formed centrally in the planar direction and second holes 422 formed therearound. The second holes 422 include one arc-shaped hole 422a and four spot holes 422b. The first insulating plate 420 in FIG. 4 is the same as in FIG. 3 except that the length in a direction along the arc of the arc-shaped hole 422a is short as compared with FIG. 3 and that the radii of curvature of corner portions are large.

Although FIG. 1 to FIG. 4 each illustrate a case where an arc-shaped hole is formed in one half region and spot holes are formed in the other half region in a plan view of a first insulating plate, these cases are not meant to be limiting. For example, a plurality of arc-shaped holes and a plurality of spot holes may be alternately disposed.

Figure 5:
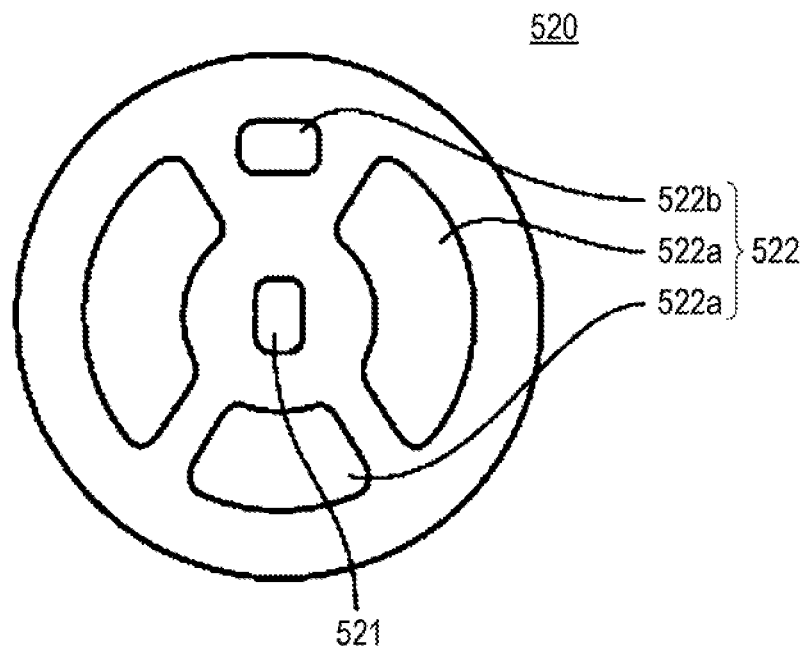
FIG. 5 is a top view schematically illustrating an insulating plate according to still another embodiment of the present invention.

A first insulating plate 520 in FIG. 5 has a first hole 521 formed centrally in the planar direction and second holes 522 formed therearound. The second holes 522 include three arc-shaped holes 522a formed along the circumferential direction of the first insulating plate 520 so as to surround the first hole 521 and one spot hole 522b disposed between two adjacent arc-shaped holes 522a. The shape and size of the first hole 521 and the spot hole 522b are substantially the same as those in FIG. 4. The first insulating plate 520 has, as the arc-shaped holes 522a, a pair of large-sized arc-shaped holes disposed on opposite sides of the first hole 521 and a small-sized arc-shaped hole disposed between the pair of arc-shaped holes and on the opposite side of the first hole 521 from the spot hole 522b.

Figure 6:
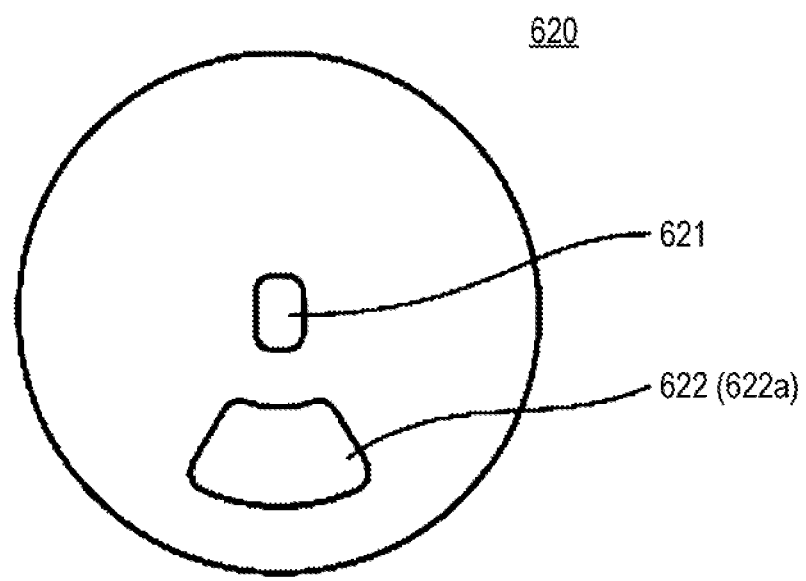
FIG. 6 is a top view schematically illustrating an insulating plate according to still another embodiment of the present invention.

A first insulating plate 620 in FIG. 6 has a first hole 621 formed centrally in the planar direction and a second hole 622 formed around the first hole. The first hole 621 has the same shape as the examples in FIG. 2 to FIG. 5. In FIG. 6, the second hole 622 includes one arc-shaped hole 622a alone. The opening ratio of the arc-shaped hole 622a is lower than the opening ratios of the arc-shaped holes in FIG. 1 to FIG. 5.

In the secondary battery, the electrode group is housed in the battery case, and the diameter of the battery case is then reduced. At this time, the battery case is inwardly protruded at the upper portion of the electrode group to form a groove outside the battery case (a protrusion is formed inside corresponding to the groove). The protrusion secures the electrode group. If emitted gas repeatedly strikes the protrusion, the protrusion is likely to deteriorate. Therefore, to inhibit gas from striking the protrusion, the second hole is preferably formed in a region distant from the outer periphery of the first insulating plate by 2 mm or more (a region 2 mm or more inward from the outer periphery). The distance from the outer periphery of the first insulating plate to the second hole is more preferably 2.5 mm or more. To facilitate the discharge of gas emitted from the vicinity of the outer periphery of the electrode group, the distance from the outer periphery of the first insulating plate to the second hole is preferably 3 mm or less.

The distance from the outer periphery of the first insulating plate to the second hole is a distance from the outer periphery (outer edge) of the first insulating plate to the outermost point of the second hole in a certain radial direction of the first insulating plate. The distance from the outer periphery of the first insulating plate to the outermost point of the second hole may vary in different radial directions as long as the shortest distance is in the above-described range.

The opening ratio of the first insulating plate is 36% or less, preferably 32% or less, more preferably 28% or less. When the opening ratio is in this range, the strength of the first insulating plate can be ensured. The opening ratio of the first insulating plate is preferably 8% or more, more preferably 10% or more. To further improve gas discharge properties, the opening ratio is preferably 20% or more. These upper limits and lower limits may be freely combined. The opening ratio of the first insulating plate may be, for example, 8% or more and 36% or less, 10% or more and 36% or less, or 10% or more and 32% or less.

In the first insulating plate, the ratio ($=T/D$) of the thickness T to the diameter D is 0.016 or less, preferably 0.015 or less. When the T/D ratio is in this range, the thickness T of the first insulating plate is small relative to the diameter D, and thus the strength of the first insulating plate tends to be low. In this embodiment, the thickness T of 0.1 mm or more is ensured, while the first insulating plate is provided with a first hole and at least one second hole as described above to achieve an opening ratio of 36% or less. With this configuration, if the T/D ratio is low as described above, strength and discharge properties can be ensured while reduction in capacity due to the volume occupied by the first insulating plate is inhibited. The thickness T of the first insulating plate is 0.1 mm or more, preferably 0.2 mm or more.

The first insulating plate can be formed of, for example, an insulating resin or an insulation-treated metal. To easily ensure the strength of the first insulating plate, the first insulating plate is preferably formed of a material having a flexural strength of 100 MPa or more. Among such materials, examples of insulating resins include curable resins (e.g., thermosetting resins) such as phenol resins, epoxy resins, and unsaturated polyester resins and thermoplastic resins such as polyphenylene sulfide resins, polyimide resins, polyamide-imide resins, polyetherimide resins, and fluorocarbon resins (e.g., polytetrafluoroethylene). Examples of metals include stainless steel and iron. The insulation treatment of a metal can be performed, for example, by coating the metal with an insulating resin. Examples of insulating resins for coating metals include, but are not limited to, polyimide resins and polypropylene resins. The first insulating plate may be formed of a material obtained by impregnating an insulating fibrous core such as a glass fiber with an insulating resin (e.g., a thermosetting resin such as a phenol resin), followed by curing.

The breaking strength of the first insulating plate is preferably 30 N or more, more preferably 50 N or more.

When the strength is in this range, the first insulating plate is less likely to break, and gas discharge properties are easily ensured.

Figure 9:
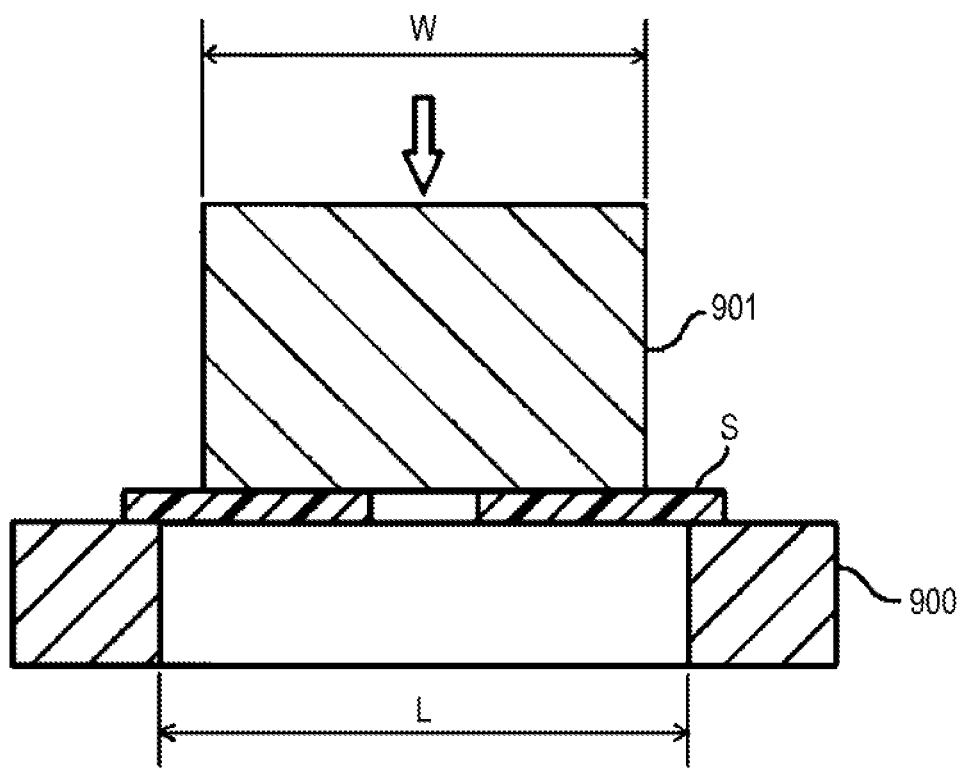
FIG. 9 is a longitudinal sectional view schematically illustrating a jig for measuring the breaking strength of an insulating plate.

In this DESCRIPTION, the breaking strength of the first insulating plate is a breaking strength measured using a jig illustrated in FIG. 9. The jig for measuring the breaking strength includes a ring-shaped base 900 having a predetermined thickness and a cylindrical pressing member 901 having a diameter smaller than the inner diameter of a hole of the base 900. The base 900 is placed such that the hole of the base 900 extends in the vertical direction, and a sample S of the first insulating plate is placed on an upper surface of the base 900 so as to cover the entire hole of the base 900. The pressing member 901 is then pressed against the sample S from above downward in the vertical direction, and the breaking strength of the first insulating plate is defined as the force applied when the sample S is broken. Preferably, the sample S is pressed with the base 900, the sample S, and the pressing member 901 being disposed such that their centers in the horizontal direction coincide with each other.

The size of the base may be selected such that the width of a portion where the first insulating plate and the base overlap each other is, for example, 0.5 mm or more and 2 mm or less. The size of the pressing member may be selected such that when the pressing member is inserted into the hole of the base, a space with a width of, for example, 1 mm or more and 6 mm or less is left between the inner wall of the hole of the base and the outer wall of the pressing member around the entire circumference of the pressing member. For example, when the diameter of the first insulating plate is 21 mm, the inner diameter (L in FIG. 9) of the base may be 18 mm, and the diameter (W in FIG. 9) of the pressing member may be 7 mm.

The first insulating plate according to this embodiment, although being small in volume, has excellent strength and can ensure high discharge properties. Thus, it is particularly suitable for use, in a secondary battery including a sealing body having a discharge valve, as an insulating plate disposed between an electrode group and the sealing body.

[Secondary Battery]

The secondary battery according to this embodiment includes a wound electrode group, an electrolyte, a cylindrical battery case that houses them, a sealing body that seals an opening of the battery case, and the above-described insulating plate (first insulating plate) disposed between the electrode group and the sealing body. The sealing body includes a discharge valve.

Figure 7:
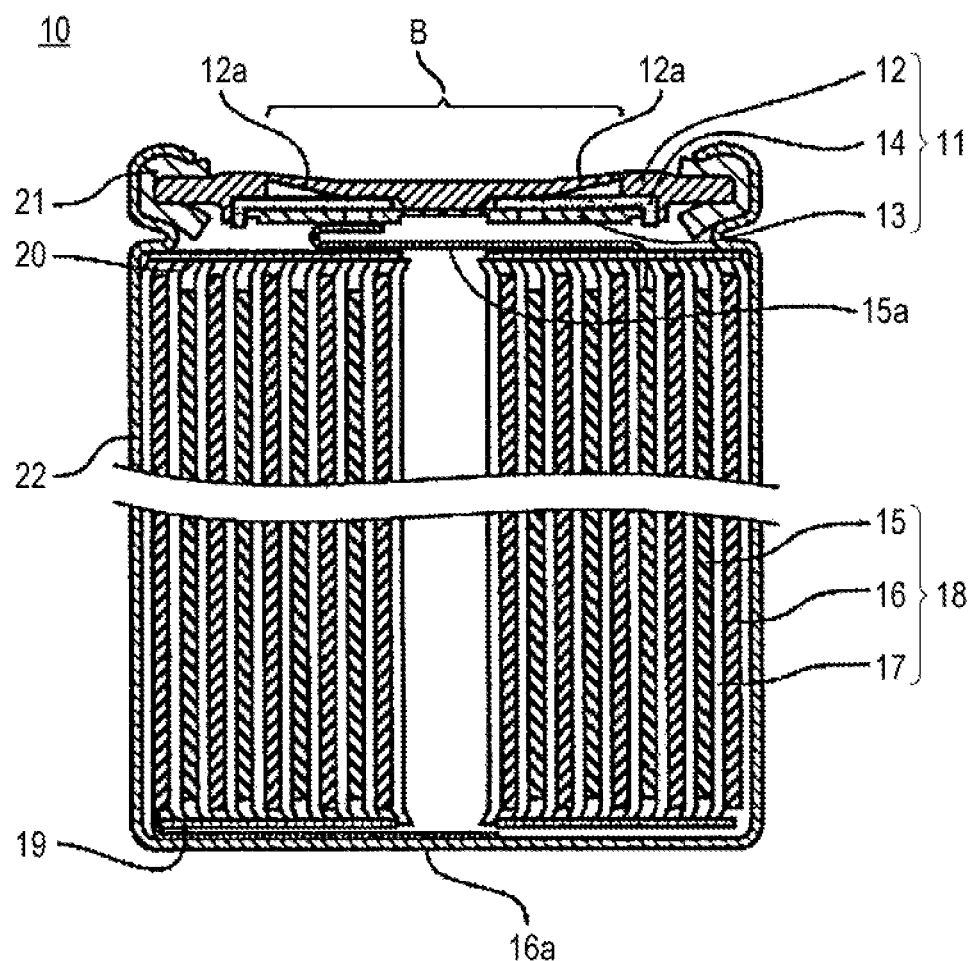
FIG. 7 is a longitudinal sectional view schematically illustrating a secondary battery including the insulating plate in FIG. 1.
Figure 8:
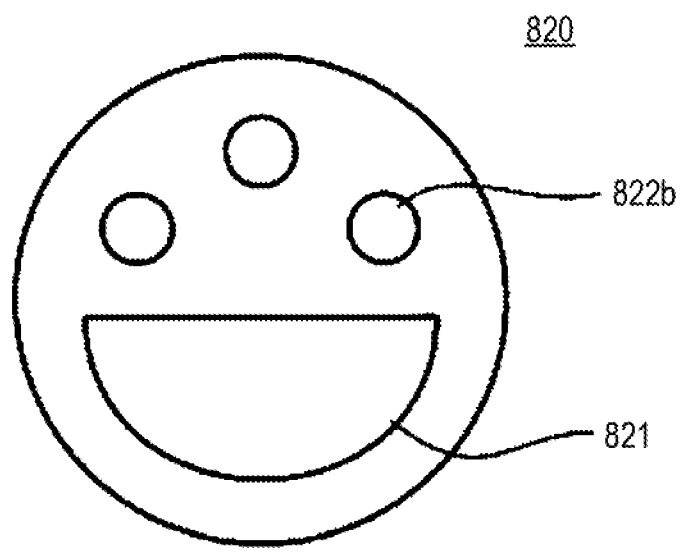
FIG. 8 is a top view schematically illustrating an insulating plate of the related art.

FIG. 7 is a schematic longitudinal sectional view of a cylindrical secondary battery according to one embodiment of the present invention. Referring to FIG. 7, the secondary battery according to this embodiment will be described below in more detail in the context of a lithium-ion secondary battery.

A cylindrical secondary battery (hereinafter, a battery) 10 includes an electrode group 18, an electrolyte (not shown), and a battery case (battery can) 22 that houses them. The electrode group 18 is formed by winding a positive electrode plate 15 and a negative electrode plate 16 with a separator 17 interposed therebetween. A ring-shaped groove is formed in the vicinity of an open end of the battery can 22.

An opening of the battery can 22 is sealed with a sealing body 11 provided, around the periphery thereof, with a gasket 21. The sealing body 11 includes a valve member 12, a metal plate 13, and a ring-shaped insulating member 14 interposed between an outer peripheral portion of the valve member 12 and an outer peripheral portion of the metal plate 13. The valve member 12 and the metal plate 13 are connected to each other at their centers. A positive electrode lead 15a extending from the positive electrode plate 15 is connected to the metal plate 13. Thus, the valve member 12 functions as a positive electrode external terminal. A negative electrode lead 16a extending from the negative electrode plate 16 is connected to the inner surface of the bottom of the battery can 22. A first insulating plate 20 is disposed between the sealing body 11 and one end of the electrode group 18. A second insulating plate 19 is disposed between the other end of the electrode group 18 and the bottom of the battery can 22.

When gas is generated in the battery 10 to excessively increase the battery internal pressure, a thin-walled portion 12a formed in the valve member 12 is pushed up and swollen, and a portion of the valve member 12 located inwardly from the thin-walled portion 12a is also swollen, as a result of which the gas is discharged from the swollen portions. That is to say, the thin-walled portion 12a and the portion located inwardly therefrom of the valve member 12 function as a discharge valve (an explosion-proof valve). In FIG. 7, a portion (the thin-walled portion 12a and the portion located inwardly therefrom) indicated by sign B is a discharge valve. The diameter of the portion indicated by B is the opening size of the discharge valve.

The positive electrode plate 15 includes a positive electrode current collector in foil form and a positive electrode active material layer formed on a surface thereof. As a material for the positive electrode current collector, aluminum, an aluminum alloy, stainless steel, titanium, a titanium alloy, or the like can be used. As the positive electrode active material, a lithium transition metal composite oxide is preferably used. For example, a composite oxide containing lithium and at least one selected from the group consisting of cobalt, manganese, nickel, chromium, iron, and vanadium is used.

The negative electrode plate 16 includes a negative electrode current collector in foil form and a negative electrode active material layer formed on a surface thereof. As a material for the negative electrode current collector, copper, a copper alloy, nickel, a nickel alloy, stainless steel, or the like can be used. As the negative electrode active material, a carbon material capable of reversibly intercalating and deintercalating lithium ions, such as natural graphite, artificial graphite, hard carbon, soft carbon, tin oxide, or silicon oxide, can be used.

As the separator 17, for example, a microporous membrane formed of a polyolefin can be used. Examples of polyolefins include polyethylene, polypropylene, and ethylene-propylene copolymers.

The electrolyte contains a non-aqueous solvent and a lithium salt dissolved in the non-aqueous solvent. As the non-aqueous solvent, a cyclic carbonate such as ethylene carbonate, propylene carbonate, or butylene carbonate; a linear carbonate such as dimethyl carbonate, diethyl carbonate, or ethyl methyl carbonate; a carboxylic acid ester; a linear ether; or the like is used. As the lithium salt, $LiPF_6$, $LiBF_4$, $LiClO_4$, or the like is used.

Examples of materials for the battery can 22 include, but are not limited to, iron, iron alloys, stainless steel, aluminum, and aluminum alloys.

The outer diameter of the battery may be, for example, 18 mm or more and 26 mm or less. However, if the outer diameter of the battery is large, it is difficult to secure the strength of the first insulating plate. In the present invention, the thickness T of the first insulating plate, the T/D ratio, and the opening ratio of the first insulating plate are controlled as described above; thus, if the outer diameter of the battery is as large as 20 mm or more, the strength of the first insulating plate can be sufficiently ensured, and at the same time, degradation of discharge properties can be reduced. The outer diameter of the battery is preferably 20 mm or more and 26 mm or less.

Also when the opening size of the discharge valve is as large as 12 mm or more, the first insulating plate is subject to loads; however, also in such a case where the opening size of the discharge valve is large, the strength of the first insulating plate can be ensured, and at the same time, gas discharge properties can be secured. The opening size of the discharge valve is preferably 10 mm or more, more preferably 12 mm or more.

The material of the second insulating plate is not particularly limited and may be selected from those described as examples for the first insulating plate. As the second insulating plate, a material may be used that contains an insulating resin, such as polypropylene or an epoxy resin, as the principal component and an insulating fibrous material as a core.

EXAMPLES

The present invention will now be described specifically with reference to examples, but the present invention is not limited to the following examples.

Example 1

(1) Fabrication of Positive Electrode Plate

One hundred parts by mass of a positive electrode active material ($LiNi_{0.8}Co_{0.15}Al_{0.05}O_2$), 1.7 parts by mass of a binding agent (polyvinylidene fluoride), and 2.5 parts by weight of a conductive agent (acetylene black) were placed in a dispersion medium and mixed together to prepare a positive electrode mixture slurry. The positive electrode mixture slurry was applied to both surfaces of a positive electrode current collector made of aluminum foil, dried, and rolled to form a positive electrode active material layer, and the coated positive electrode current collector was cut to a predetermined size to obtain a positive electrode plate. An exposed area was formed at a part of the positive electrode current collector, and an aluminum positive electrode lead was connected to the exposed area.

(2) Fabrication of Negative Electrode Plate

One hundred parts by mass of a negative electrode active material (graphite), 0.6 parts by mass of a binding agent (styrene-butadiene rubber), and 1 part by weight of a thickener (carboxymethylcellulose) were placed in a dispersion medium and mixed together to prepare a negative electrode mixture slurry. The negative electrode mixture slurry was applied to both surfaces of a negative electrode current collector made of copper foil, dried, and rolled to form a negative electrode active material layer, and the coated negative electrode current collector was cut to a predetermined size to obtain a negative electrode. An exposed area was formed at a part of the negative electrode current collector, and a nickel negative electrode lead was connected to the exposed area.

(3) Preparation of Non-Aqueous Electrolyte

Ethylene carbonate (EC), dimethyl carbonate (DMC), and ethyl methyl carbonate (EMC) were mixed together to prepare a non-aqueous solvent. $LiPF_6$ was dissolved in the non-aqueous solvent at a concentration of 1 mol/L to obtain a non-aqueous electrolyte.

(4) Fabrication of Battery

The positive electrode plate and the negative electrode plate were wound with a polyolefin microporous membrane (separator) interposed therebetween to fabricate an electrode group. The second insulating plate was disposed on the lower end surface of the electrode group. The electrode group with the second insulating plate was inserted into a battery can, and the negative electrode lead was resistance-welded to the bottom of the battery can. The battery can used was an iron can whose inner surface was nickel-plated.

After a disk shape first insulating plate made of glass fibers impregnated with a phenol resin was disposed on the upper end surface of the electrode group, a ring-shaped groove was formed in the vicinity of the open end of the battery can. The first insulating plate used was one having a first hole and second holes as illustrated in FIG. 1. The first insulating plate had a thickness T of 0.3 mm, a T/D ratio of 0.149, and an opening ratio of 31.2%. The aspect ratio of the first hole was 1.5, and the opening ratio of the first hole was 1.6%. The breaking strength of the first insulating plate was 82 N. The radii of curvature of two corner portions on the outer periphery side of an arc-shaped hole were both 1 mm.

Next, the positive electrode lead is connected to a metal plate provided in a sealing body provided with a safety mechanism, and the sealing body was supported on the ring-shaped groove formed in the battery can via a gasket. The open end of the battery can was caulked to the periphery of the sealing body, thereby completing a lithium-ion secondary battery.

Example 2

The first insulating plate used was one illustrated in FIG. 2. The first insulating plate had a thickness T of 0.3 mm, a T/D ratio of 0.149, and an opening ratio of 27.6%. The aspect ratio of the first hole was 1.36, and the opening ratio of the first hole was 1.9%. The breaking strength of the first insulating plate was 65 N. The radii of curvature of two corner portions on the outer periphery side of an arc-shaped hole were both 0.8.

Example 3

The first insulating plate used was one illustrated in FIG. 3. The first insulating plate had a thickness T of 0.3 mm, a T/D ratio of 0.149, and an opening ratio of 28.3%. The aspect ratio of the first hole was 1.36, and the opening ratio of the first hole was 1.9%. The breaking strength of the first insulating plate was 83 N. The radii of curvature of two corner portions on the outer periphery side of an arc-shaped hole were 2 mm and 1.5 mm.

Example 4

The first insulating plate used was one illustrated in FIG. 4. The first insulating plate had a thickness T of 0.3 mm, a T/D ratio of 0.149, and an opening ratio of 24.3%. The aspect ratio of the first hole was 1.36, and the opening ratio of the first hole was 1.9%. The breaking strength of the first insulating plate was 110 N. The radii of curvature of two corner portions on the outer periphery side of an arc-shaped hole were 2 mm and 1.5 mm.

Example 5

The first insulating plate used was one illustrated in FIG. 5. The first insulating plate had a thickness T of 0.3 mm, a T/D ratio of 0.149, and an opening ratio of 35.2%. The aspect ratio of the first hole was 1.36, and the opening ratio of the first hole was 1.9%. The breaking strength of the first insulating plate was 80 N. The radii of curvature of two corner portions on the outer periphery side of an arc-shaped hole were both 0.8 mm.

Example 6

The first insulating plate used was one illustrated in FIG. 6. The first insulating plate had a thickness T of 0.3 mm, a T/D ratio of 0.149, and an opening ratio of 8.9%. The aspect ratio of the first hole was 1.36, and the opening ratio of the first hole was 1.9%. The breaking strength of the first insulating plate was 180 N. The radii of curvature of two corner portions on the outer periphery side of an arc-shaped hole were both 0.8 mm.

As described above, in Examples, the first insulating plates are provided with high breaking strength despite their small T/D ratio. Therefore, when the first insulating plates of Examples are used, breakage and deformation of the first insulating plates are less likely to occur, and impairment of discharge through a discharge valve of a sealing body can be reduced.

INDUSTRIAL APPLICABILITY

The insulating plate according to the present invention has excellent strength and also can ensure high discharge properties, and thus is suitable for use in a secondary battery in which gas is generated, particularly, in a non-aqueous electrolyte secondary battery such as a lithium-ion secondary battery.

REFERENCE SIGNS LIST

10: secondary battery
11: sealing body
12: valve member
12a: thin-walled portion
13: metal plate
14: insulating member
15: positive electrode plate
15a: positive electrode lead
16: negative electrode plate
16a: negative electrode lead
17: separator
18: electrode group
19: second insulating plate
20: first insulating plate
21: gasket
22: battery case (battery can)
220, 320, 420, 520, 620: first insulating plate
121, 221, 321, 421, 521, 621: first hole
122, 222, 322, 422, 522, 622: second hole
122a, 222a, 322a, 422a, 522a, 622a: arc-shaped hole
122b, 222b, 322b, 422b, 522b: spot hole
820: first insulating plate
821: semicircular hole
822b: spot hole
B: discharge valve

The invention claimed is:

1. A secondary battery comprising:
a wound electrode group;
an electrolyte;
a cylindrical battery case that houses the electrode group and the electrolyte;
a sealing body that seals an opening of the battery case and includes a discharge valve; and
an insulating plate disposed between the electrode group and the sealing body,
wherein the insulating plate has a disk shape with a thickness T of 0.1 mm or more,
the insulating plate has a first hole formed centrally therein and at least one second hole formed around the first hole so as to extend along an outer periphery of the disk shape,
a ratio (=T/D) of the thickness T to a diameter D of the insulating plate is 0.016 or less, and
the insulating plate has an opening ratio of 36% or less,
wherein the first hole is smaller than one of the at least one second hole.

2. The secondary battery according to claim 1,
wherein the first hole is disposed above a winding axis of the electrode group, and
the second hole is disposed on an outer periphery side of the electrode group.

3. The secondary battery according to claim 1,
wherein the first hole has a vertically elongated shape, and the first hole has an aspect ratio of 1.2 or more and 4 or less.

4. The secondary battery according to claim 1,
wherein the first hole has an opening ratio of 1% or more and 3% or less.

5. The secondary battery according to claim 1,
wherein the insulating plate has an opening ratio of 20% or more and 32% or less.

6. The secondary battery according to claim 1,
wherein the second hole includes at least one arc-shaped hole and at least one spot hole.

7. The secondary battery according to claim 6,
wherein the arc-shaped hole has two corner portions on an outer periphery side of the disk shape and two corner portions on an inner periphery side of the disk shape,
at least the two corner portions on the outer periphery side are rounded, and
the two corner portions on the outer periphery side each have a radius of curvature of 0.8 mm or more.

8. The secondary battery according to claim 1,
wherein the second hole is formed in a region distant from an outer periphery of the insulating plate by 2.5 mm or more.

9. The secondary battery according to claim 1,
wherein the insulating plate is formed of a material having a flexural strength of 100 MPa or more.

10. The secondary battery according to claim 1,
wherein the discharge valve has an opening size of 10 mm or more.

11. The secondary battery according to claim 10,
wherein the secondary battery has an outer diameter of 20 mm or more.

12. The secondary battery according to claim 1,
wherein the secondary battery has no discharge valves at a bottom of the battery case.

13. A secondary battery comprising:
a wound electrode group;
an electrolyte;
a cylindrical battery case that houses the electrode group and the electrolyte;
a sealing body that seals an opening of the battery case and includes a discharge valve; and
an insulating plate disposed between the electrode group and the sealing body, wherein the insulating plate has a disk shape with a thickness T of 0.1 mm or more,
the insulating plate has a first hole formed centrally therein and at least one second hole formed around the first hole,
a ratio (=T/D) of the thickness T to a diameter D of the insulating plate is 0.016 or less, and
the insulating plate has an opening ratio of 36% or less,
wherein the first hole is smaller than one of the at least one second hole.

* * * * *